United States Patent
Breese

[19]

[11] Patent Number: 6,113,498
[45] Date of Patent: Sep. 5, 2000

[54] HALF ROUND END YOKE HAVING ANGLED BOLT BORES

[75] Inventor: Douglas E. Breese, Northwood, Ohio

[73] Assignee: Dana Corporation, Toledo, Ohio

[21] Appl. No.: 09/224,447

[22] Filed: Dec. 31, 1998

[51] Int. Cl.⁷ .................................................. F16D 3/16
[52] U.S. Cl. ...................... 464/130; 464/112; 464/136; 403/6; 403/11
[58] Field of Search ..................... 464/134, 135, 464/136, 130, 905; 405/6, 7, 8; 403/11

[56] References Cited

U.S. PATENT DOCUMENTS

| | | |
|---|---|---|
| 2,253,300 | 8/1941 | Karlberg . |
| 3,889,583 | 6/1975 | Ballheimer .............................. 74/579 R |
| 4,291,552 | 9/1981 | Orain . |
| 4,520,771 | 6/1985 | Hayashi ............................... 123/195 H |
| 5,643,090 | 7/1997 | Smith ....................................... 464/130 |

*Primary Examiner*—Lynne H. Browne
*Assistant Examiner*—Kenneth Thompson
*Attorney, Agent, or Firm*—MacMillan, Sobanski & Todd, LLC

[57] ABSTRACT

A half round end yoke and a pair of retainer straps retain an opposed pair of bearing cups to the half round end yoke in such a universal joint. The half round end yoke includes a body defining an axis of rotation having first and second arms extending therefrom. Each of the first and second arms has a semi-cylindrical recess formed therein that is adapted to receive a bearing cup. A pair of threaded bores is formed in each of the first and second arms. Retainer straps are disposed about the bearing cups to retain them within the semi-cylindrical recesses. Each of the retainer straps includes a curved central portion having a pair of straight end portions extending outwardly therefrom. The end portions have respective apertures formed therethrough that can be aligned with the threaded bores formed in the arms of the half round end yoke. Threaded fasteners extend through the apertures formed through the end portions of the retainer strap into cooperation with the threaded bores formed in the arms of the half round end yoke so as to secure the retainer strap thereto. The threaded bores are formed within the arms at an angle relative to the axis of rotation of the half round end yoke when viewed in a first direction and at an angle relative to the axis of rotation of the half round end yoke when viewed in a second direction transverse to the first direction. The apertures formed through the retainer straps may extend at the same angles as the bores.

20 Claims, 4 Drawing Sheets

HALF ROUND END YOKE HAVING ANGLED BOLT BORES

BACKGROUND OF THE INVENTION

This invention relates in general to universal joints for use in vehicular drive train assemblies. In particular, this invention relates to an improved structure for a half round end yoke and a pair of retainer straps for retaining an opposed pair of bearing cups to the half round end yoke in such a universal joint.

In most land vehicles in use today, a drive train system is provided for transmitting power from a source of rotational power, such as an internal combustion or diesel engine, to a plurality of driven wheels of the vehicle. A typical drive train system includes a clutch, a transmission, a driveshaft assembly, and an axle assembly that are connected in series between the engine and the driven wheels of the vehicle. The clutch is connected to the output shaft of the engine for selectively providing a driving connection therethrough to the input shaft of the transmission. The transmission provides a plurality of gear ratios between the input shaft and an output shaft connected to the forward end of the driveshaft assembly. The driveshaft assembly is elongated so as to transmit the rotational power from the transmission to the vicinity of the driven wheels of the vehicle. The axle assembly includes an input shaft that is connected to the rearward end of the driveshaft assembly, a differential gear mechanism that is rotatably driven by the input shaft, and a pair of output axle shafts that connect the differential gear mechanism to the driven wheels of the vehicle.

Usually, the output shaft of the transmission and the input shaft of the axle assembly are not co-axially aligned with one another. To accommodate this, a typical driveshaft assembly includes an elongated driveshaft tube having a pair of universal joints secured to the ends thereof. The first universal joint is connected to the output shaft of the transmission, while the second universal joint is connected to the input shaft of the axle assembly. The universal joints provide a rotational driving connection from the output shaft of the transmission through the driveshaft tube to the input shaft of the axle assembly, while accommodating a limited amount of angular misalignment therebetween.

A typical universal joint includes a cross having a central body portion with four trunnions extending outwardly therefrom. The trunnions are oriented in a single plane and extend at right angles relative to one another. A bearing cup is mounted on the end of each of the trunnions. Needle bearings or similar means are provided between each of the trunnions and its associated bearing cup to permit the bearing cup to rotate relative to the trunnion. A first pair of opposed bearing cups is connected to a first end yoke, while a second pair of opposed bearing cups is connected to a second end yoke.

Typically, the first and second end yokes can be classified as one of two general structures, namely, a full round end yoke and a half round end yoke. A full round end yoke includes a pair of opposed arms having respective cylindrical openings formed therethrough, within which the opposed bearing cups are inserted. Flat retaining members are usually provided over the outer ends of the bearing cups for retaining them within the cylindrical openings. A half round end yoke includes a pair of opposed arms having respective semi-cylindrical recesses formed therein, within which the opposed bearing cups are received. Retaining straps are usually provided about the circumferential sides of the bearing cups for retaining them within the semi-cylindrical recesses.

A typical structure for a retaining strap for use with a half round end yoke includes a stamped plate having a curved central portion with a pair of straight end portions extending outwardly therefrom. The curved central portion of the retainer strap is semi-cylindrical in shape so as to conform with the outer surface of the bearing cup. The end portions of the retainer strap have respective holes formed therethrough that can be aligned with threaded bores formed in the arms of the half round end yoke. Threaded bolts or similar fasteners extend through the holes formed through the end portions of the retainer strap into cooperation with the threaded bores formed in the arms of the half round end yoke so as to secure the retainer strap thereto. In this manner, the bearing cup is retained within the semi-cylindrical recess of the half round end yoke by the retainer strap.

Typically, the holes formed through the end portions of the retainer straps and the threaded bores formed in the arms of the half round end yoke have been oriented in a direction that extends parallel to, but is offset from, the axis of rotation of the half round end yoke. Thus, the threaded bolts or similar fasteners were installed and removed by engaging them with a tool that was also oriented in a direction that extended parallel to, but offset from, the axis of rotation of the half round end yoke. This half round end yoke retaining structure has functioned satisfactorily for many years with conventional driveshaft tubes.

Traditionally, driveshaft tubes have been formed from steel alloys having a constant diameter throughout the entire length thereof. Steel alloys are relatively high strength materials. Thus, for a given torque load requirement in a vehicle, a steel alloy driveshaft tube can be formed having a relatively small diameter. For example, in many light trucks and similar vehicles, conventional steel alloy driveshaft tubes have been formed having a diameter of approximately three to three and one-half inches. Unfortunately, steel alloys are also relatively heavy materials. As mentioned above, the weight of the driveshaft assembly is supported at its forward end by the output shaft of the transmission and at its rearward end by the input shaft of the axle assembly. Thus, care must be taken to insure that the weight of the driveshaft assembly can be adequately supported by the transmission bearings that rotatably support the output shaft of the transmission and the axle bearings that rotatably support the input shaft of the axle assembly.

In some vehicles, the distance between the output shaft of the transmission and the input shaft of the axle assembly is relatively small. In those vehicles, the weight of a single elongated driveshaft tube formed from a steel alloy material can be adequately carried by the transmission and axle bearings. However, in other vehicles, the distance between the output shaft of the transmission and the input shaft of the axle is relatively large. It has been found that the weight of a single elongated driveshaft tube formed from a steel alloy material places an undesirably large load on the transmission and axle bearings. In those instances, it is known to split a single elongated driveshaft tube formed from a steel alloy material into a pair of relatively short driveshaft tube sections that are themselves connected together by a third universal joint. A center bearing assembly is provided to support the weight of the interior ends of the two driveshaft sections on the frame of the vehicle, while allowing relative rotation thereof. This structure has been found to sufficiently reduce the amount of weight placed upon the transmission and axle bearings to an acceptable level. However, this structure adds undesirable cost and complexity to the structure and installation of the driveshaft assembly.

Recently, there has been a movement to form driveshaft tubes from alloys of aluminum, as opposed to steel. Aluminum alloys are both strong and lightweight and, therefore, are usually regarding as desirable substitutes for steel alloys in driveshaft tubes. Thus, the weight of a single elongated driveshaft tube formed from an aluminum alloy material is much lighter that a comparably sized driveshaft tube formed from a steel alloy material. Accordingly, a single elongated driveshaft tube formed from an aluminum alloy material can be used in lieu of a split driveshaft assembly structure formed from a steel alloy material (including the third universal joint and center bearing assembly discussed above) without placing an undesirably large load on the transmission and axle bearings.

However, it has been found that an aluminum alloy driveshaft tube having a diameter that is comparable to the diameter of a corresponding steel alloy driveshaft tube tends to vibrate when the vehicle is driven at normal operating speeds. Such vibrations are undesirable because they generate noise. To address this, it has been found desirable to form aluminum alloy driveshaft tubes having a diameter that is somewhat larger than the diameter of a corresponding conventional steel driveshaft tube. For example, in a vehicle drive train system including a steel alloy driveshaft tube having a diameter of approximately three to three and one-half inches, it has been found acceptable to substitute an aluminum alloy driveshaft tube having a diameter of approximately five inches. The larger diameter aluminum alloy driveshaft tube does not vibrate when the vehicle is driven at normal operating speeds. Unfortunately, it has been found that the use of a larger diameter driveshaft tube can undesirably restrict access of the tool to engage the threaded fasteners for installation of the driveshaft assembly onto the vehicle. Thus, it would be desirable to provide an improved structure for a half round end yoke and a pair of retainer straps that facilitates the use of a tool for installing and removing the threaded fasteners when the universal joint is used in conjunction with a driveshaft tube having a relatively large diameter.

SUMMARY OF THE INVENTION

This invention relates to an improved structure for a half round end yoke and a pair of retainer straps for retaining an opposed pair of bearing cups to the half round end yoke in a universal joint. The half round end yoke includes a body defining an axis of rotation having first and second arms extending therefrom. Each of the first and second arms has a semi-cylindrical recess formed therein that is adapted to receive a bearing cup. A pair of threaded bores is formed in each of the first and second arms. The threaded bores are formed within the arms at an angle relative to the axis of rotation of the half round end yoke when viewed in a first direction and at an angle relative to the axis of rotation of the half round end yoke when viewed in a second direction transverse to the first direction. Retainer straps are disposed about the bearing cups to retain them within the semi-cylindrical recesses. Each of the retainer straps includes a curved central portion having a pair of end portions extending outwardly therefrom. The end portions have respective apertures formed therethrough that can be aligned with the threaded bores formed in the arms of the half round end yoke. Threaded fasteners extend through the apertures formed through the end portions of the retainer strap into cooperation with the threaded bores formed in the arms of the half round end yoke so as to secure the retainer strap thereto. The apertures formed through the retainer straps may extend at the same angles as the bores.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
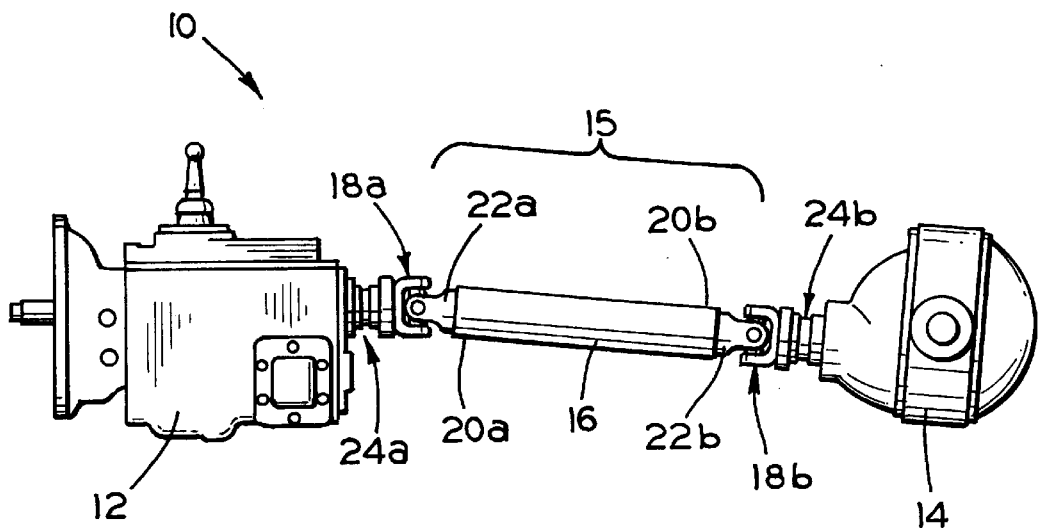
FIG. 1 is a side elevational view schematically illustrating a vehicle drive train assembly including a pair of universal joints, each having a half round end yoke and a pair of retainer straps in accordance with the invention.

Referring now to the drawings, there is illustrated in FIG. 1 a vehicular drive train assembly, indicated generally at 10, including a transmission 12 that is connected to an axle assembly 14 through a driveshaft assembly 15. The driveshaft assembly includes a driveshaft tube 16 that is preferably hollow and cylindrical in shape, having forward and rearward ends 20a and 20b. The driveshaft tube 16 can be formed from any suitable material, such as a lightweight aluminum alloy (6061 alloy, for example). The driveshaft tube 16 is formed having a relatively large outer diameter, such as approximately five inches, for example. However, the driveshaft tube 16 may be formed having any desired size.

As is typical, an output shaft (not shown) of the transmission 12 and an input shaft (not shown) of the axle assembly 13 are not co-axially aligned. Therefore, first and second universal joints 18a and 18b are provided to respectively connect the forward and rearward ends 20a and 20b of the driveshaft tube 16 to the transmission output shaft and the axle assembly input shaft. To accomplish this, tube yokes 22a and 22b are secured to the ends 20a and 20b of the driveshaft tube 16. The illustrated tube yokes 22a and 22b are somewhat smaller in diameter than the driveshaft tube 16 and are secured to the ends of the driveshaft tube 16 by welding. However, the tube yokes 22a and 22b may be formed having any desired size and may be secured to the ends 20 of the driveshaft tube 16 in any conventional manner. Alternatively, the tube yokes 22a and 22b may be formed integrally with the ends 20a and 20b of the driveshaft tube 16. Additionally, end yokes, indicated generally at 24a and 24b, or other types of end fittings are connected to both the output shaft of the transmission 12 and the input shaft of the axle assembly 14. The structures of the end yokes 24a and 24b will be described in detail below.

Figure 2:
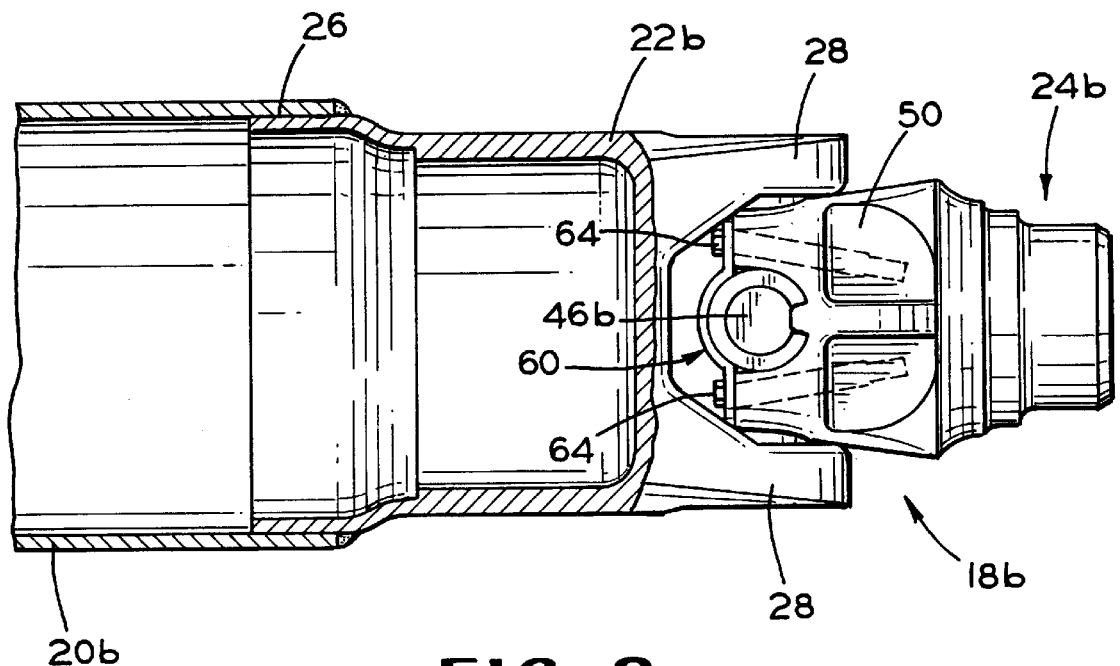
FIG. 2 is an enlarged top plan view, partially in cross section, of the rearward end of the driveshaft tube and the second universal joint illustrated in FIG. 1.
Figure 3:
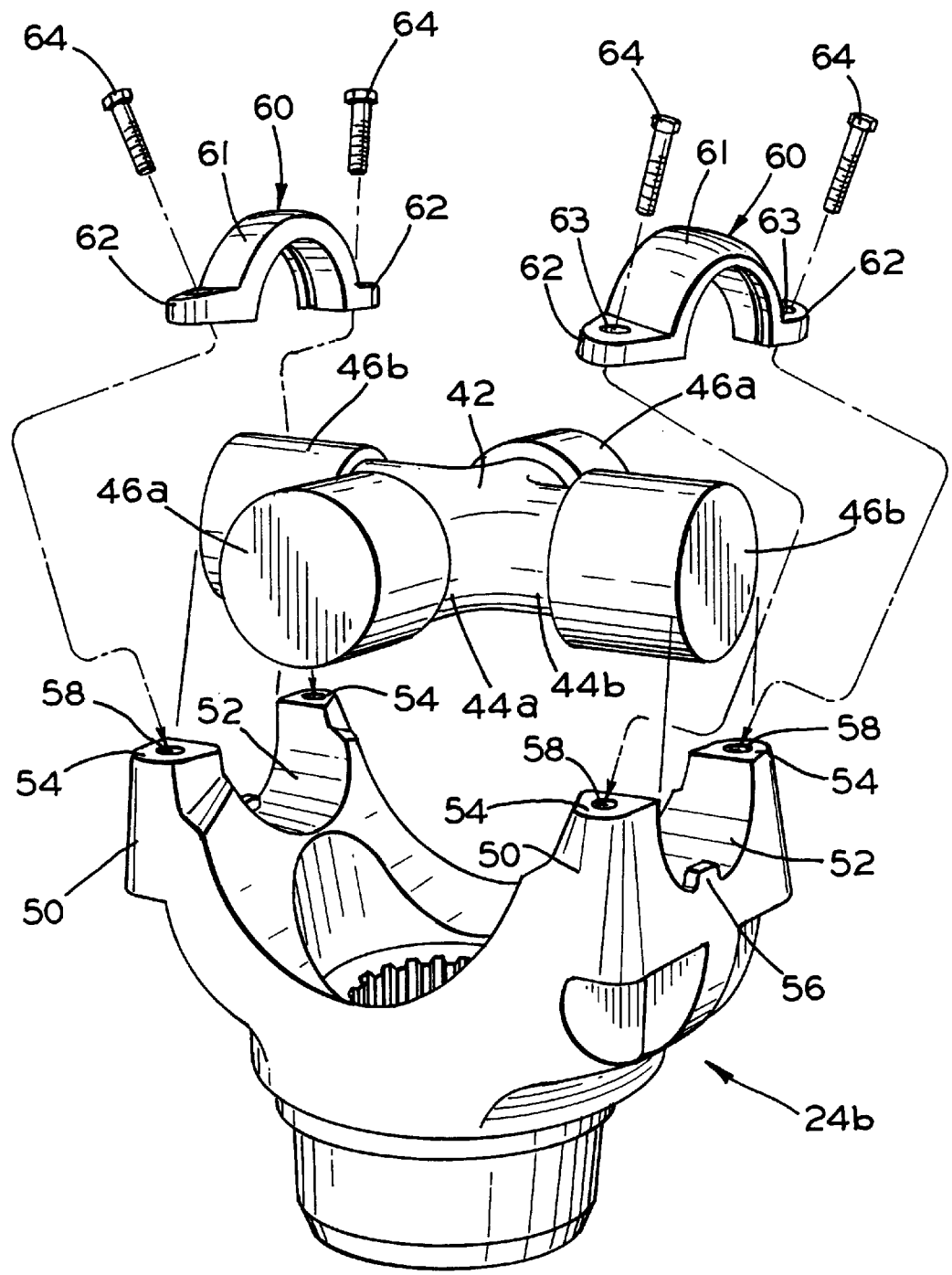
FIG. 3 is an enlarged exploded perspective view of the half round end yoke, cross, retainer straps, and threaded fasteners of the second universal joint illustrated in FIG. 2.

FIGS. 2 and 3 illustrate the structure of the rearward universal joint 18b in more detail. As shown in FIG. 2, the tube yoke 22b is formed having a tube seat 26 at one end and a pair of yoke arms 28 at the other end. The tube seat 26 is preferably sized to fit snugly within the end 20b of the driveshaft tube 16. The illustrated tube yoke 22b is a full round yoke, wherein the arms 28 have co-axially aligned cross holes (not shown) formed therethrough. The cross holes are provided to receive two opposed bearing cups 46a (see FIG. 3) mounted on respective trunnions 44a of a cross member 42 in a well known manner. The other two trunnions 44b of the cross member 42 have bearing cups 46b mounted thereon and are connected to the arms 28 of the half round end yoke 24b in a manner described in detail below.

As best shown in FIG. 3, the half round end yoke 24b includes a body defining an axis of rotation and having a pair of opposed yoke arms 50 extending therefrom. Each of the arms 50 has a semi-cylindrical recess 52 formed therein. The semi-cylindrical recesses 52 are shaped to conform with the shape of the bearing cups 46b so that the bearing cups 46b can be received therein. Each of the arms 50 terminates in a pair of flat end faces 54 having respective threading bores 58 formed therein. The structure of and purpose for the threaded bores 58 will be explained below. Each of the arms 48 can further be provided with a retaining tang 56 which extends inwardly over a portion of the associated semi-cylindrical recess 52. The purpose for the retaining tangs 56 will also be explained below.

The cross member 22 is assembled with the half round end yoke 24b by initially positioning the opposed bearing cups 46b within the semi-cylindrical recesses 52 formed on the yoke arms 52. Then, respective retainer straps, indicated generally at 60, are disposed about the bearing cups 46b to retain the bearing cups 46b within the semi-cylindrical recesses 52 and, therefore, retain the cross 42 on the half round end yoke 24b. To accomplish this, each of the retainer straps 60 includes a curved central portion 61 having a pair of straight end portions 62 extending outwardly therefrom. The curved central portion 61 of the retainer strap 60 is semi-cylindrical in shape so as to conform with the outer surface of the bearing cup 46b. The end portions 62 of the retainer strap 60 have respective apertures 63 formed therethrough that can be aligned with the threaded bores 58 formed in the arms 50 of the half round end yoke 24b. Threaded bolts or similar fasteners 64 extend through the apertures 63 formed through the end portions 62 of the retainer strap 60 into cooperation with the threaded bores 58 formed in the arms 50 of the half round end yoke 24b so as to secure the retainer strap 60 thereto. In this manner, the bearing cups 46b are retained within the semi-cylindrical recesses 52 of the half round end yoke 24b by the retainer straps 60.

Figures 4, 5:
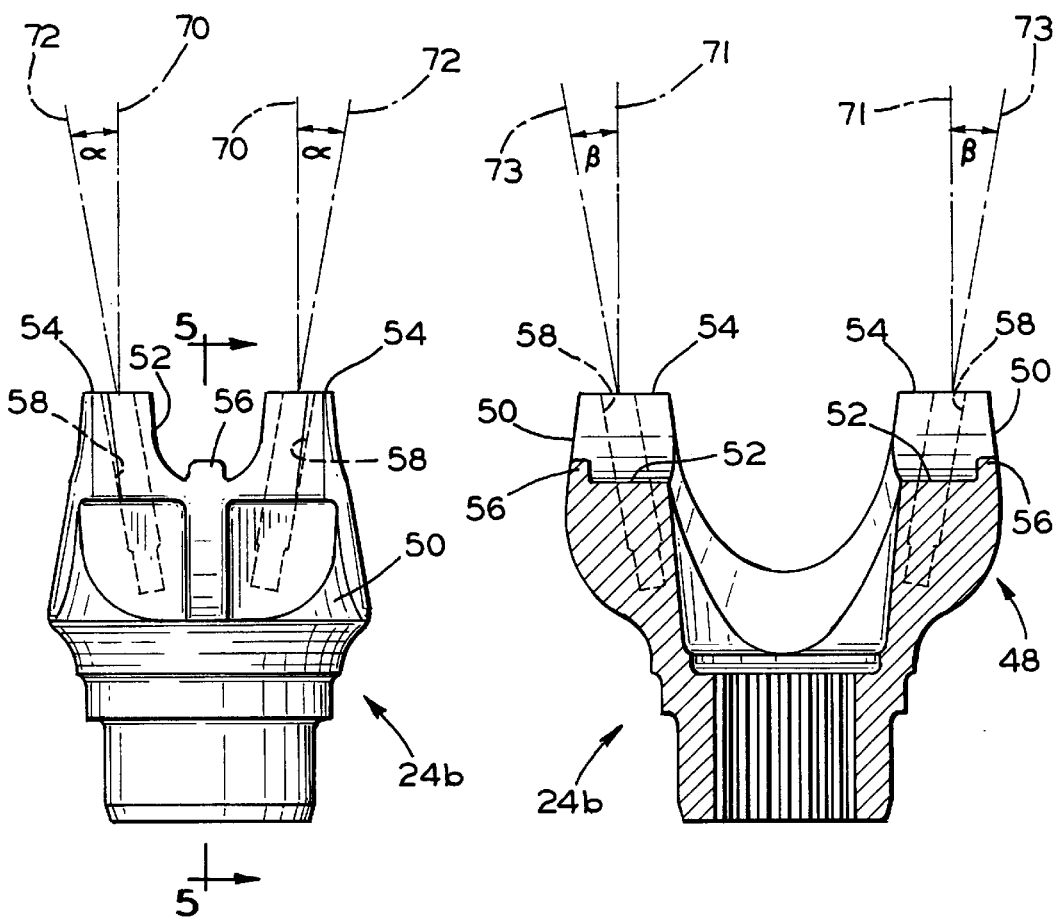
FIG. 4 is a top plan view of the half round end yoke illustrated in FIG. 3.
FIG. 5 is a sectional elevational view of the half round end yoke taken along line 5—5 of FIG. 4.

In a conventional structure for the half round end yoke 24b, the threaded bores 58 are formed within the arms 50 so as to extend parallel to, but offset from, the axis of rotation of the half round end yoke 24b. Thus, as shown in FIG. 4, the threaded bores 58 in one of the arms 50 of the half round end yoke 24b extend along axes (indicated by the dotted lines 70) that are parallel to one another and that lie within a plane that extends through both of the threaded bores 58 on that arm 50. Similarly, as shown in FIG. 5, the threaded bores 58 in the opposed arms 50 of the half round end yoke 24b extend along axes (indicated by the dotted lines 71) that are parallel to one another and that lie within a plane that extends through both of the threaded bores 58 on those opposed arms 50.

When the threaded bores 58 were oriented along the lines 70 and 71, the threaded fasteners 64 could installed and removed by engaging them with a tool (not shown) that was also oriented in a direction that extended parallel to, but offset from, the axis of rotation of the half round end yoke 24b (i.e., extending along the lines 70 and 71). However, as discussed above, it has recently been found desirable to form the driveshaft tube 16 having a diameter that is somewhat larger than has previously been known. Unfortunately, it has been found that the use of a larger diameter driveshaft tube undesirably restricts access of the tool to engage the threaded fasteners 64 for installation and removal when the threaded bores 58 extend as shown by the dotted lines 70 and 71 in FIGS. 4 and 5, respectively.

To overcome this tool clearance issue, this invention contemplates that the threaded bores 58 be formed within the arms 50 so as to extend at an angle relative to the axis of rotation of the half round end yoke 24b. As shown in FIGS. 4 and 5, the threaded bores 58 are formed within the arms 50 at an angle $\alpha$ relative to the axis of rotation of the half round end yoke 24b when viewed in a first direction (from above) and at an angle $\beta$ relative to the axis of rotation of the half round end yoke 24b when viewed in a second direction transverse to the first direction (from the side). Thus, in FIG. 4, the threaded bores 58 formed in one of the arms 50 of the half round end yoke 24b extend along axes (indicated by the dotted lines 72) that are angled (i.e., not parallel) relative to one another. In FIG. 5, the threaded bores 58 in illustrated opposed arms 50 of the half round end yoke 24b extend along axes (indicated by the dotted lines 73) that are angled (i.e., not parallel) relative to one another.

It will be appreciated that in this embodiment, none of the lines 72 or 73 lie within either a plane that extends through both of the threaded bores 58 on the arm 50 illustrated in FIG. 4 or within a plane that extends through both of the threaded bores 58 on those opposed arms 50 illustrated in FIG. 5. Rather, as best shown in FIG. 3, the four threaded bores 58 (as well as the threaded fasteners 64 threaded therein) all diverge outwardly from the half round end yoke 24b. In the preferred embodiment, the angle $\alpha$ is preferably in the range of from about one-tenth of one degree to about twenty degrees, more preferably is in the range of from about five degrees to about fifteen degrees, and most preferably is about twelve degrees. Similarly, the angle $\beta$ is preferably in the range of about one-tenth of one degree to about twenty-five degrees, more preferably is in the range of from about ten degrees to about twenty degrees, and most preferably is about sixteen degrees.

Alternatively, this invention contemplates that the threaded bores 58 be formed within the arms 50 so as to extend only at an angle $\alpha$ relative to the axis of rotation of the half round end yoke 24b when viewed from above. Thus, the angle $\beta$ would essentially zero degrees, or parallel to the axis of rotation of the half round end yoke 24b when viewed from the side. In other words, the lines 72 would extend as illustrated in FIG. 4, but the lines 73 illustrated in FIG. 5 would be essentially coincident with the lines 71. The angle $\alpha$ can extend at the same angle as described above. It should be noted that in either instance, the threaded bores 58 may be oriented to intersect each other.

Figure 6:
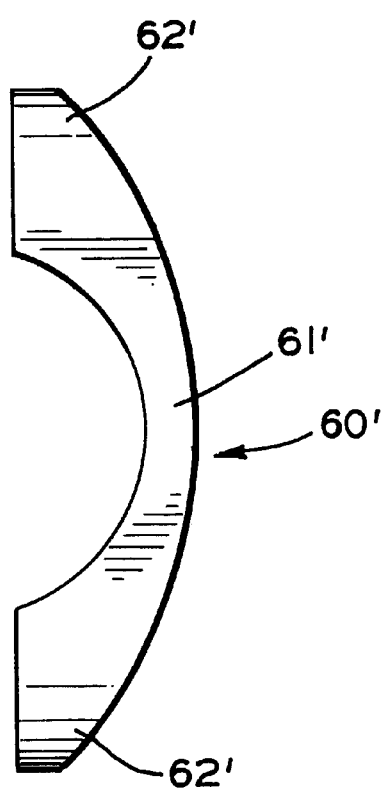
FIG. 6 is a top plan view of an alternative embodiment of the retainer strap illustrated in FIG. 3.
Figure 7:
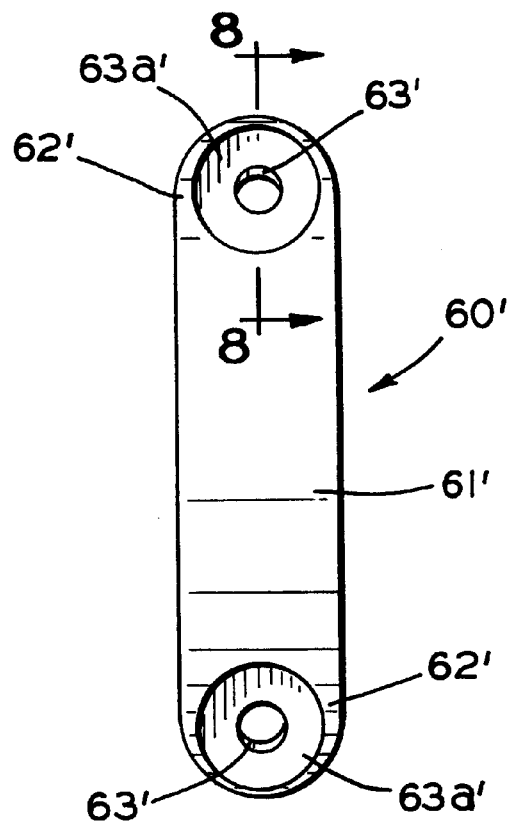
FIG. 7 is a side elevational view of the alternative embodiment of the retainer strap illustrated in FIG. 6.
Figure 8:
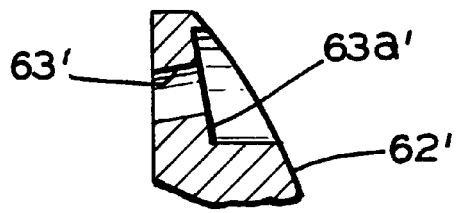
FIG. 8 is sectional elevational view of one end portion of the alternative embodiment of the retainer strap taken along line 8—8 of FIG. 7.

The retainer strap 60 may, as is known in the art, be manufactured from a stamped plate that is formed to have the curved central portion 61 and the straight end portions 62. In retainer straps 60 of this type (such as illustrated in FIGS. 2 and 3) wherein the thickness of the end portions 62 is relatively small and uniform, the apertures 63 formed through the end portions 62 may be oriented to extend parallel with the axis of rotation of the half round end yoke 24. However, it has been found desirable in some instances to manufacture a modified retainer strap 60' having end portions that are relatively thick and non-uniform, such as the shown in the alternative embodiment illustrated in FIGS. 6, 7, and 8. Such a retainer strap 60' has a curved central portion 61' having a pair of end portions 62' extending outwardly therefrom and can, for example, be manufactured using a forging process. In those instances, it may be desirable to form the apertures 63' to extend at the same angles as the threaded bores 58. If desired, recessed areas 63a' may be formed in the end portions 62' of the retainer strap 60', and the apertures 63' may extend from such recessed areas 63a'.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An end fitting for use in a vehicular drive train assembly comprising:

a body defining an axis of rotation;

first and second arms extending from said body, each of said first and second arms having a recess formed therein; and a pair of bores formed in each of said first and second arms, said bores in said first arm extending along axes that are angled relative to said axis of rotation when viewed in a first direction and are angled relative to said axis of rotation when viewed in a second direction transverse to the first direction.

2. The end fitting defined in claim 1 wherein said bores in said second arm extend along axes that are angled relative to said axis of rotation when viewed in a first direction and are angled relative to said axis of rotation when viewed in a second direction transverse to the first direction.

3. The end fitting defined in claim 1 wherein said bores in said first and second arms all extend along axes that are angled relative to said axis of rotation when viewed in a first direction and are angled relative to said axis of rotation when viewed in a second direction transverse to the first direction.

4. The end fitting defined in claim 1 wherein said bores in said first arm extend at an angle of from about one-tenth of one degree to about twenty degrees.

5. The end fitting defined in claim 1 wherein said bores in said first arm extend at an angle of from about five degrees to about fifteen degrees.

6. The end fitting defined in claim 1 wherein said bores in said first arm extend at an angle of about twelve degrees.

7. The end fitting defined in claim 1 wherein said bores in said second arm extend at an angle of from about one-tenth of one degree to about twenty-five degrees.

8. The end fitting defined in claim 1 wherein said bores in said second arm extend at an angle of from about ten degrees to about twenty degrees.

9. The end fitting defined in claim 1 wherein said bores in said second arm extend at an angle of about sixteen degrees.

10. An end fitting assembly for use in a vehicular drive train assembly comprising:

a body defining an axis of rotation;

first and second arms extending from said body, each of said first and second arms having a recess formed therein;

a pair of bores formed in each of said first and second arms, said bores in said first arm extending along axes that are angled relative to said axis of rotation when viewed in a first direction and are angled relative to said axis of rotation when viewed in a second direction transverse to the first direction; and a retainer strap secured to each of said first and second arms.

11. The end fitting assembly defined in claim 10 wherein said bores in said second arm extend along axes that are angled relative to said axis of rotation when viewed in a first direction and are angled relative to said axis of rotation when viewed in a second direction transverse to the first direction.

12. The end fitting assembly defined in claim 10 wherein said bores in said first and second arms all extend along axes that are angled relative to said axis of rotation when viewed in a first direction and are angled relative to said axis of rotation when viewed in a second direction transverse to the first direction.

13. The end fitting assembly defined in claim 10 wherein said bores in said first arm extend at an angle of from about one-tenth of one degree to about twenty degrees.

14. The end fitting assembly defined in claim 10 wherein said bores in said first arm extend at an angle of from about five degrees to about fifteen degrees.

15. The end fitting assembly defined in claim 10 wherein said bores in said first arm extend at an angle of about twelve degrees.

16. The end fitting assembly defined in claim 10 wherein said bores in said second arm extend at an angle of from about one-tenth of one degree to about twenty-five degrees.

17. The end fitting assembly defined in claim 10 wherein said bores in said second arm extend at an angle of from about ten degrees to about twenty degrees.

18. The end fitting assembly defined in claim 10 wherein said bores in said second arm extend at an angle of about sixteen degrees.

19. The end fitting assembly defined in claim 10 wherein said retainer straps have apertures formed therethrough, and wherein fasteners extend through said apertures into cooperation with said bores to secure said retainers to each of said first and second arms.

20. The end fitting assembly defined in claim 19 wherein said apertures formed through said retainer straps extend at the same angles as said bores.

* * * * *